(12) United States Patent
Handlin et al.

(10) Patent No.: US 6,323,299 B1
(45) Date of Patent: Nov. 27, 2001

(54) METHOD FOR PRODUCING MIXED POLYOL THERMOPLASTIC POLYURETHANE COMPOSITIONS

(75) Inventors: Dale Lee Handlin, Houston; Sudha Mohindra, Katy; Michael Alan Masse, Richmond; David John St. Clair, Houston, all of TX (US)

(73) Assignee: Kraton Polymers U.S. LLC, Houston, TX (US)

(*) Notice: Subject to any disclaimer, the term of this patent is extended or adjusted under 35 U.S.C. 154(b) by 0 days.

(21) Appl. No.: 09/451,793

(22) Filed: Dec. 1, 1999

Related U.S. Application Data

(60) Provisional application No. 60/110,634, filed on Dec. 2, 1998.

(51) Int. Cl.[7] .................................................. C08G 8/63
(52) U.S. Cl. ............................. 528/65; 528/75; 525/123; 525/131
(58) Field of Search .................... 525/123, 131; 528/75, 65

(56) References Cited

U.S. PATENT DOCUMENTS

| | | | |
|---|---|---|---|
| 3,058,955 | 10/1962 | Neumann et al. ................. | 260/77.5 |
| 3,291,859 | 12/1966 | Tobolsky ............................ | 260/859 |
| 3,304,273 | 2/1967 | Stamberger ........................ | 260/2.5 |
| 3,941,855 | 3/1976 | Ehrhard ............................. | 260/77.5 |
| 4,242,468 | 12/1980 | Baack et al. ...................... | 521/170 |
| 4,321,343 | 3/1982 | Rooney ............................. | 525/534 |
| 4,883,837 | 11/1989 | Zabrocki .......................... | 525/66 |
| 4,906,673 | 3/1990 | Mori et al. ....................... | 521/131 |
| 5,188,716 | 2/1993 | Schwerzel et al. .............. | 204/181.7 |
| 5,378,761 | 1/1995 | St. Clair ........................... | 525/111 |
| 5,459,200 | 10/1995 | St. Clair ........................... | 525/131 |
| 5,554,691 | 9/1996 | St. Clair ........................... | 525/111 |
| 5,580,947 | 12/1996 | Brahm et al. ..................... | 528/75 |
| 5,589,543 | * 12/1996 | Yokelsen et al. ................. | 525/131 |

FOREIGN PATENT DOCUMENTS

| | | | |
|---|---|---|---|
| 0732349 A2 | 2/1996 | (EP) ................................. | C08G/18/40 |
| 6-267058 | 9/1994 | (JP) ................................. | G11B/5/702 |

* cited by examiner

Primary Examiner—Rachel Gorr

(57) ABSTRACT

A process for preparing a thermoplastic polyurethane resin from a polydiene having terminal functional groups selected from the group consisting of hydroxy, amine, and carboxylic acid, at least one polymeric diol selected from the group consisting of polyester polyols, polyether polyols, and polycarbonate polyols, an isocyanate having an average functionality of 2, and a chain extender which comprises:

(a) first reacting the polydiene and the isocyanate at 70 to 100° C. for 10 to 60 minutes, (b) adding to the reaction product of (a) the polymeric diol and reacting these components at 70 to 100° C. for 60 to 150 minutes to form a prepolymer, and (c) adding the chain extender and reacting these components at 70 to 125° C. for 1 to 24 hours to form a thermoplastic polyurethane. This invention also relates to a thermoplastic polyurethane composition comprised of the above component and having a hard segment content of 15 up to but less than 30 percent by weight, a tensile strength of at least 1500 psi and a Shore A hardness of no more than 90.

20 Claims, No Drawings

US 6,323,299 B1

METHOD FOR PRODUCING MIXED POLYOL THERMOPLASTIC POLYURETHANE COMPOSITIONS

This application claims the benefit of U.S. Provisional Application No. 60/110,634, filed Dec. 2, 1998, the entire disclosure of which is hereby incorporated by reference.

FIELD OF THE INVENTION

This invention relates to thermoplastic polyurethane elastomer compositions containing a polydiene diol, a polyester or polyether polyol, an isocyanate, and a chain extender. More particularly, this invention relates to a novel improved process for making such compositions and to the compositions themselves which exhibit both softness and high strength.

BACKGROUND OF THE INVENTION

A polyurethane is generally prepared in bulk by reacting a polyether or polyester polyol of number average molecular weight 500 to 10,000, preferably 1000 to 4000 and typically 1,000 to 2,000, with an isocyanate and a low molecular weight "chain extender". If the chain extender is a diol, the polyurethane produced is thermoplastic and is typically referred to as a thermoplastic polyurethane (TPU), whereas if the chain extender has more than two hydroxyl groups per molecule or is an amine, then the polyurethane is a thermoset, typically referred to as a cast elastomer. The most common chain extender for TPUs is 1,4 butane diol. Butane diol is favored because it is an easily handled liquid, forms crystallizable hard segments, and is a commodity chemical. 4,4' methylene diisocyanate, MDI, is the most common isocyanate used in TPUs because it is linear which allows it to form high strength, crystalline hard blocks with butane diol. Toluene diisocyanate, TDI is typically used for foams and cast elastomers because it is a liquid, forms low viscosity prepolymers because of the difference in reactivity of the two isocyanate groups, and because it is less expensive than MDI.

Polyurethanes get their strength from the phase separation of the "soft phase", called the soft segment, from the "hard phase", referred to as the hard segment. Thus in standard urethane terminology the terms soft segment, which is the polyol, and hard segment, which is the sum of the isocyanate and chain extender, refer to the components used in making the polymer and not the physical composition of the phases in the final material. In reality the soft phase contains a substantial fraction of isocyanate and perhaps some chain extender in addition to the polyol.

Block lengths and hard segment contents are limited by the molecular weights of the starting materials. In the simplest example, a polyurethane which does not contain a chain extender, the hard segment content is determined by the molecular weight of the polyol. A TPU made from a 1,000 molecular weight (MW) polyol and MDI at a 1:1 NCO:OH ratio would have a hard segment content of 20%, whereas a 2,000 MW polyol would have a hard segment content of 11%. The addition of a chain extender then allows the adjustment of the hard segment without regard to the polyol molecular weight. However, since the hard blocks are normally very short, 1 to 4 "units" on average, phase separation is very sensitive to hard segment length which is coupled to polyol molecular weight. Therefore, for a given compatibility of the hard and soft phases, there is a hard segment content which provides optimal mechanical properties. Typically polyurethanes have hard segment contents between 30 and 50% because with the polyester and polyether polyols which are normally used, this level of hard segment content is necessary to achieve a composition with sufficient strength to be useful. This produces a range of materials that are typically harder than 70 Shore A. Soft, strong elastomers are difficult to design in these polyurethane systems because short hard segments are too compatible with the soft segments. It would be highly advantageous to be able to produce TPUs which are both soft and strong for use in applications which require this combination of attributes such as toys, sports grips, sealants, compounded rubbers, and adhesives. The present invention provides such soft, strong TPUs which have a hard segment content from 15 up to 30% by weight but still have a tensile strength of 1500 psi.

The molecular weight of the hard block distribution of the hard segment can also be strongly affected by the synthesis method. There are two standard methods of making a polyurethane: the one shot and prepolymer methods. In the one shot method the polyol, isocyanate, and chain extender are mixed together and cast into a mold, or reaction extruded to form pellets. Compatibility is extremely important in this method because phase separation and polymerization occur concurrently. If phase separation occurs too early, the polymerization will not be complete. An incomplete polymerization produces a low molecular weight polymer and leaves unreacted isocyanate groups which may lead to crosslinking either by thermally induced reactions or reaction with water. If phase separation occurs too late, the hard and soft phases will be poorly separated. This results in a high soft segment Tg, a low hard segment Tg (or Tm), high hysteresis, and poor tensile properties.

In the prepolymer method the polyol is reacted with part or all of the isocyanate. In the final step a chain extender, and more isocyanate if necessary, are mixed into the prepolymer and cured into the final TPU or cast elastomer. The prepolymer step may be the first step in an extrusion line, or the two steps may take place at two different locations. Here the compatibility requirements are somewhat reduced by the pre-reaction of the polyol with the isocyanate.

European Patent Application EP 0,732,349 describes thermoplastic polyurethane resins which are prepared by reacting an isocyanate, a polyol, a functionalized polyolefin, and a chain extender. The patent application describes both a one shot and a prepolymer process for preparing these compositions. In the one shot process, the polyol, terminally functional polyolefin, and chain extender were mixed together at elevated temperature for several hours and then the isocyanate was added. In the prepolymer method, the polyol and the terminally functionalized polyolefin were mixed together in a reactor and heated. Then the isocyanate was added and the reaction was allowed to proceed for about two hours. Finally, the chain extender was added to the mixture and allowed to react. We have found that the methods described in the European patent application produced TPUs with inferior tensile strength, elongation, and modulus. The present invention provides an improved process for producing mixed polyol TPUs which results in higher tensile strength and elongation and lower modulus.

SUMMARY OF THE INVENTION

The present invention provides a process for preparing a thermoplastic polyurethane resin from a polydiene having terminal functional groups selected from the group consisting of hydroxy, amine, and carboxylic acid, at least one polymeric diol selected from the group consisting of polyester polyols, polyether polyols, and polycarbonate polyols, an isocyanate having an average functionality of two, and a chain extender. The process comprises (a) first reacting the polydiene and the isocyanate at 70 to 100° C. for 10 to 60 minutes, (b) then adding to the reaction product of (a) the polymeric diol and reacting these components at 70 to 100° C. for 60 to 150 minutes to form a prepolymer, and finally, (c) adding the chain extender and reacting these components at 70 to 125° C. for 1 to 24 hours to form a thermoplastic polyurethane.

This invention also encompasses a new composition that can be made according to the above-described process. This thermoplastic polyurethane is formed by utilizing from 15 to 40 percent weight of the polydiene, from 15 to 60 percent weight of the polymeric diol, from 10 to 25 percent weight of the isocyanate, and from 1 to 10 percent weight of the chain extender. In a most preferred embodiment, the polydiene is a polydiene diol, the isocyanate is a diisocyanate, and the NCO:OH ratio in the thermoplastic polyurethane is from 0.95 to 1.1.

The present invention provides novel soft, strong TPUs which have a hard segment content from 15 up to but less than 30% by weight. These TPUs have a Shore A hardness of no more than 90 but still have a tensile strength of at least 1500 psi.

DETAILED DESCRIPTION OF THE INVENTION

The polydienes having terminal functional groups, particularly the preferred diols, used in this invention are prepared anionically such as described in U.S. Pat. Nos. 5,376,745, 5,391,663, 5,393,843, 5,405,911, and 5,416,168, which are incorporated by reference herein. The polydiene diols have from 1.6 to 2, more preferably from 1.8 to 2, and most preferably from 1.9 to 2 terminal hydroxyl groups per molecule, and a number average molecular weight between 500 and 20,000, more preferably between 1000 and 10,000. The polydiene diols have hydroxyl equivalent weights between about 250 and about 10,000, preferably between 500 and 5,000 (hydroxyl equivalent weight is half because its a diol and has two hydroxyls). Hydrogenated polybutadiene diols are preferred and these preferably have 1,4-addition between 30% and 70% to minimize viscosity.

Polymerization of the polydiene diols commences with a monolithium or dilithium initiator that builds a living polymer backbone at each lithium site. The conjugated diene is typically 1,3-butadiene or isoprene. The anionic polymerization is done in solution in an organic solvent, typically a hydrocarbon like hexane, cyclohexane or benzene, although polar solvents such as tetrahydrofuran can also be used. When the conjugated diene is 1,3-butadiene and when the resulting polymer will be hydrogenated, the anionic polymerization of butadiene in a hydrocarbon solvent like cyclohexane is typically controlled with structure modifiers such as diethylether or glyme (1,2-diethoxyethane) to obtain the desired amount of 1,4-addition. The optimum balance between low viscosity and high solubility in a hydrogenated polybutadiene polymer occurs in the range of 40 to 60% 1,4-butadiene content. This butadiene microstructure is achieved during polymerization at 50° C. in cyclohexane containing about 6% by volume of diethylether or about 1000 ppm of glyme.

Anionic polymerization is terminated by addition of a functionalizing agent like those in U.S. Pat. Nos. 5,391,637, 5,393,843, and 5,418,296, which are also incorporated by reference, but preferably ethylene oxide, prior to termination.

The preferred di-lithium initiator is formed by reaction of two moles of sec-butyllithium with one mole of diisopropenylbenzene. This diinitiator is used to polymerize butadiene in a solvent composed of 90% w cyclohexane and 10% w diethylether. The molar ratio of diinitiator to monomer determines the molecular weight of the polymer. The living polymer is then capped with two moles of ethylene oxide and terminated with two moles of methanol to yield the desired polydiene diol.

The polydiene diol can also be made using a mono-lithium initiator that contains a hydroxyl group that has been blocked as the silyl ether (as in U.S. Pat. Nos. 5,376,745 and 5,416,168, which are also incorporated by reference). A suitable initiator is hydroxypropyllithium in which the hydroxyl group is blocked as the trimethylsilyl ether. This mono-lithium initiator can be used to polymerize butadiene in hydrocarbon or polar solvent. The molar ratio of initiator to monomer determines the molecular weight of the polymer. The living polymer is then capped with one mole of ethylene oxide and terminated with one mole of methanol to yield the mono-hydroxy polydiene polymer. The silyl ether is then removed by acid catalyzed cleavage in the presence of water yielding the desired dihydroxy polydiene diol.

The polybutadiene diols are generally hydrogenated such that at least 90%, preferably at least 95%, of the carbon to carbon double bonds in the diols are saturated. Hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755 which is also incorporated by reference. A particularly preferred catalyst is a mixture of nickel 2-ethylhexanoate and triethylaluminum.

The polybutadiene polymer should have no less than about 30% 1,2-butadiene addition because, after hydrogenation, the polymer will be a waxy solid at room temperature if it contained less than about 30% 1,2-butadiene addition. To minimize viscosity of the diol, the 1,2-butadiene content should be between about 40 and 60%. The isoprene polymers have no less than 80% 1,4-isoprene addition in order to reduce Tg and viscosity. The diene microstructures are typically determined by $^{13}C$ nuclear magnetic resonance (NMR) in chloroform.

The molecular weights of the polymers are conveniently measured by Gel Permeation Chromatography (GPC), where the GPC system has been appropriately calibrated. The polymers can be characterized from the data in the chromatogram by calculating the number-average molecular weight (Mn) and by calculating the weight-average molecular weight (Mw), or by measuring the "peak" molecular weight. The peak molecular weight is the molecular weight of the main specie shown on the chromatogram. For anionically polymerized linear polymers, the polymer is nearly monodisperse (Mw/Mn ratio approaches unity), and usually it is adequately descriptive to report the peak molecular weight of the narrow molecular weight distribution observed. Usually, the peak molecular weight value is between Mn and Mw. The molecular weights reported here are number average molecular weights calculated from the chromatographs. The materials used in the columns of the GPC are styrene-divinylbenzene gels or silica gels. The solvent is tetrahydrofuran and the detector is a refractive index detector.

The mixed polyol polyurethane system of the present invention also comprises a polymeric diol. The polymeric diol is generally a polyether or polyester polyol, but it may also be a polycarbonate polyol. The polymeric diol has a number average molecular weight of 500 to 10,000, preferably 1000 to 4000 and typically 1000 to 3000. Examples of suitable polymeric diols include polyether diols, polyester diols, hydroxy-terminated polycarbonate, hydroxy-terminated copolymers of dialkyl siloxane and alkylene oxides such as ethylene oxide, propylene oxide, and the like, and mixtures thereof.

Examples of suitable polyether polyols include polyoxyethylene glycols, polyoxypropylene glycols, random and block copolymers of ethylene oxide and propylene oxide, polytetramethylene glycol, random and block copolymers of tetrahydrofuran and ethylene oxide and/or propylene oxide. The preferred polyether polyols are random and block copolymers of ethylene and propylene oxide of functionality approximately 2.0 and polytetramethylene glycol polymers of functionality about 2.0.

Suitable polyester polyols include the ones which are prepared by polymerizing epsilon-caprolactone using an initiator such as ethylene glycol, ethanol amine, and the like, and those prepared by esterification of polycarboxylic acids such as phthalic, terephthalic, succinic, glutaric, adipic, azelaic, and the like acids with polyhydric alcohols such as ethylene glycol, butane diol, cyclohexane-dimethanol, and the like.

Examples of polycarbonates containing hydroxyl groups include those prepared by reaction of diols such as propane-1,3-diol, butane-1,4-diol, hexane-1,6-diol, 1,9-nonanediol, 2-methyloctane-1,8-diol, diethylene glycol, triethylene glycol, dipropylene glycol, and the like with diaryl carbonates such as diphenyl carbonate or with phosgene. Examples of suitable silicon-containing polyethers include copolymers of alkylene oxides with dialkyl siloxanes such as dimethyl siloxane and the like. The preferred polymeric diols of the present invention are polytetremethylene glycols, poly (propylene glycols), and poly(hexamethylene adipate) polyester polyols.

The preferred, especially for TPUs, chain extender is a low molecular weight hydrocarbon material having not more than two functional groups that will react with the diisocyanate, preferably a diol. The number average molecular weight preferably is from 50 to 600, most preferably 50 to 120. The hydroxyl equivalent weight of the chain extending diol will usually be between about 25 and about 200 grams per hydroxyl group, preferably between about 25 and 100 grams per hydroxyl group.

The chain extender preferably is a linear diol having 2 to 12 carbon atoms and can be selected from the group 1,4-butane diol, 1,5-pentane diol, 1,6-hexane diol, ethylene glycol, and the like. Chain extending diols also suitable for use in the present invention include branched aliphatic diols having 5 to 40 carbon atoms, especially branched aliphatic diols having 5 to 30 carbon atoms such as 2-ethyl-1,3-hexane diol (PEP diol), 2,2,4-trimethyl-1,3-pentane diol (TMPD diol), and 2-ethyl-2-butyl-1,3-propane diol (BEPD diol) because they are substituted, branched diols and, as such, are not as polar and therefore not as incompatible with the polydiene polymers as unsubstituted, straight chain diols.

The isocyanate used in this invention is an isocyanate having an average functionality of two isocyanate groups per molecule. Examples of suitable diisocyanates are 2,4-toluene diisocyanate, 4,4'-diphenylmethane diisocyanate, mixtures of isomers of diphenylmethane diisocyanate, paraphenyldiisocyanate, isophoronediisocyanate, bis(4-isocyanatocyclohexyl)-methane, naphthalene diisocyanate, and hexamethylene diisocyanate.

Blocked isocyanates made by reacting these diisocyanates and polyisocyanates with suitable blocking agents are also useful. Suitable blocking agents are phenols, alcohols such as butanol, hexanol, etc., oximes such as butanone oxime and caprolactam. The particular blocking agent used determines the temperature at which the blocking agent will deblock.

Specific commercially available isocyanates that can be used in this invention include those found in the following table:

| Designation | Chemical Identification | Eq. wt. | Supplier |
|---|---|---|---|
| Mondur M (MDI) | 4,4-diphenylmethane diisocyanate | 125 | Bayer AG |
| Mondur ML | Liquid MDI | 125 | Bayer AG |
| Vestanat (IPDI) | Isophorone diisocyanate | 111 | Huls |
| Desmodur BL4165 | Butanone oxime blocked polymeric IPDI | 519 | Bayer AG |
| Mondur TD-80 (TDI) | Toluene diisocyanate | 87 | Bayer AG |
| Desmodur W (HMDI) | Methylene bis(4-cyclohexyl-isocyanate) | 131 | Bayer AG |
| PPDI | 1,4-Phenylene diisocyanate | 80 | duPont |
| Desmodur H (HDI) | 1,6-hexamethylene diisocyanate | 84 | Bayer AG |

The prior art, as exemplified by European Patent Application EP 0,732,349, describes two methods for making polyurethanes of this type. One is the one shot method wherein all of the components are mixed together at the same time. The other is the prepolymer method wherein the polyols are mixed together and then reacted together with the isocyanate. We have found that our process produces significant advantages over these prior art processes.

The process of the present invention requires that the polydiene be reacted with the isocyanate prior to reaction with the polymeric diol. This reaction step is carried out at a temperature of from 70 to 100° C. for 10 to 60 minutes. It is important to prereact the polydiene and the isocyanate because the reaction product has an enhanced polarity and is then compatible with conventional polymeric diols such as polyether polyols, polyester polyols, and polycarbonate polyols.

The next step of the process of the present invention is to react the reaction product above with the polymeric diol. This is carried out a temperature of from 70 to 100° C. for 60 to 150 minutes and a prepolymer is the resulting reaction product. Finally, the chain extender is added to the prepolymer and the components are reacted at from 70 to 125° C. for 1 to 24 hours to form a thermoplastic polyurethane A catalyst may be used in the method of manufacturing said TPU. Suitable catalysts may be selected from organic and inorganic acid salts of, and organometallic derivatives of bismuth, lead, tin, iron, antimony, uranium, cadmium, cobalt, thorium, aluminium, mercury, zinc, nickel, cerium, molybdenum, vanadium, copper, titanium, manganese and zirconium, as well as phosphines and tertiary organic amines. Preferred organotin catalysts are stannous octoate, stannous oleate, dibutyltin dioctoate, dibutyltin dilaurate, and the like. Preferred tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine and the like. The amount of catalyst employed in the method is generally within the range of about 0.005 to about 2.0 wt % based on the total weight of the reactants.

This process may advantageously carried out using a co-rotating reaction extruder. The reaction extruder is preferably a multiple screw reaction extruder. The method using the extruder preferably does not include any solvent. A prepolymer, heated to a temperature in the range 30 to 70° C., preferably 40 to 60° C. may then be fed to an inlet of said reaction extruder. A chain extender, which may be heated, but which is suitably at ambient temperature, may also be fed into an inlet, suitably the same inlet, of said reaction extruder at this stage. The temperature of the reactants in said extruder suitably does not exceed 270° C., preferably does not exceed 250° C., more preferably does not exceed 240° C. and, especially, does not exceed about 230° C.

A suitable co-rotating reaction extruder is a twin-screw extruder comprising a series of kneading/mixing zones separated by conveying screws. Steps may need to be taken to increase the residence time of the reactants in the extruder in order to produce TPUs having the desired properties. This may easily be carried out by a person skilled in the art, for example by including a length of reverse pitch conveying/mixing zones in a region of the extruder.

The polydiene diols are preferred for use in the present process because they enhance the phase separation of flexible and non-flexible segments in the final product and thereby yield higher strengths than would be realized with polymeric diols alone. It is preferred that the NCO-OH ratio be in the range of from 0.95 to 1.1 because this range yields the highest molecular weights in the thermoplastic polyurethane thereby yielding higher strengths.

The process of this invention can be used to produce thermoplastic polyurethanes having hard segment contents of 15 up to and greater than 50 percent by weight if it is so desired. Thus, compositions of the type described in the prior art, i.e., having hard segment contents of 30 to 50 percent by weight, can be made according the present invention. However, a novel preferred thermoplastic polyurethane can be made according to the present invention. That polyurethane has a hard segment content of from 15 up to but less than 30 percent by weight. It is soft and strong. It has a tensile strength of at least 1500 psi while maintaining a Shore A hardness of no more than 90.

We believe that the following theory explains why the compositions of the present invention are able to achieve the specified strength and softness at such low hard segment contents. It is believed that the polyester and polyether polyols used from the prior art are too compatible with the isocyanates and chain extenders to allow them to produce thermoplastic elastomers of sufficient strength at hard segment contents below 30 percent by weight. The polydiene functionalized polymers of the present invention are much more incompatible with the chain extenders and thus with those materials present in the composition, the phase separation becomes much better and this leads to increased strength. The increased strength allows the hard segment content to be lowered and still achieve the same level of strength as with the prior art compositions. As the hard segment content lowers, the composition becomes softer. Because of the poor compatibility of the polydiene diol with the polymeric diols, it is important that the polydiene diol is first reacted with the isocyanate to increase its polarity. After this reaction is complete the reaction with the polymeric diol forms a "capped" prepolymer with the polymeric diol on the outside providing better compatibility with the chain extender added in the final step.

The polymerization process can be conducted in the presence of catalysts. Catalysts useful in accelerating the NCO/OH reaction are tertiary amines such as tetramethyl butane diamine, and triethylamine, pyridine, 1,4-diaza(2,2,2)bicyclo-octane and organo-metallic compounds such as tin dioctoate and dibutyl tin dilaurate. These catalysts are used at levels ranging from 0.001% by weight to 1.0% by weight.

A wide variety of fillers can be used in formulations with the present invention. Suitable fillers include calcium carbonate, clays, talc, zinc oxide, titanium dioxide, silica and the like. The amount of filler usually is in the range of 0 to about 800 parts by weight (pbw), depending on the type of filler used and on the application for which the formulation is intended. Preferred fillers are silica and titanium dioxide. The filler should be thoroughly dried in order that adsorbed moisture will not interfere with the reaction between the polyisocyanate and the saturated, polyhydroxylated polydiene polymer.

Stabilizers known in the art may also be incorporated into the composition. These may be for protection during the life of the product against, for example, oxygen, ozone and ultra-violet radiation. These may also be for stabilization against thermo-oxidative degradation during elevated temperature processing. Antioxidants and UV inhibitors that interfere with the urethane curing reaction must be avoided. Preferred antioxidants are the sterically hindered phenolic compounds like butylated hydroxy toluene. Preferred UV inhibitors are UV absorbers such as benzotriazole compounds. The amount of stabilizer in the formulation will depend greatly on the intended application of the product. If processing and durability requirements are modest, the amount of stabilizer in the formulation will be less than about 1 pbw. If the polyurethane will be mixed at high temperature or if the product must survive many years in service, stabilizer concentration could be as much as about 10 pbw.

EXAMPLES

TABLE 1

| | Materials | | |
|---|---|---|---|
| Designation | Chemical Identification | Eq. Wt. | Supplier |
| Polymer A | Hydroxyl-terminated poly(ethylene-butylene) polymer | 1727 | Shell Chemical Co. |
| Polymer B | Hydroxyl-terminated poly(ethylene-butylene) polymer | 1660 | Shell Chemical Co. |
| TERATHANE ® 2000 | Polytetramethylene glycol | 1000 | duPont |
| 1,4-BD | 1,4-Butanediol | 45 | GAF Corporation |
| DESMOPHEN ® 2502 | Poly(butylene adipate) glycol | 1000 | Bayer AG |

TABLE 1-continued

Materials

| Designation | Chemical Identification | Eq. Wt. | Supplier |
|---|---|---|---|
| ACCLAIM ® R-2350 | Polypropylene glycol | 2040 | Arco |
| FORMEZ ® 66-37 | Hexamethylene adipate | 1464 | Witco |
| PC-1122 | Polycarbonate polyol | 1022 | Stahl |
| PC-1733 | Polycarbonate polyol | 440 | Stahl |
| MONDUR ® M (MDI) | 4,4'-diphenylmethane diisocyanate | 125 | Bayer AG |
| T-12 | Dibutyltin dilaurate | — | Aldrich Chemical Co. |

Prepolymer Preparation

Standard Preparation

Prepolymers were made so that stoichiometric chain extension with butane diol at an NCO:OH ratio of 1.02 would yield a TPU with 22% hard segment. The EB Diol, Polymer A, was first reacted with MDI in bulk at 90° C. for 30 minutes (approximately the time necessary to complete the reaction) A second polyol was then added and the reaction was allowed to continue until the residual NCO content had reached a plateau, usually 2 to 4 hours. The NCO content was followed by the following titration procedure:

1. a small sample, <0.5 gm, was reacted with dibutyl amine in toluene for 30 minutes
2. 50 ml of isopropanol and 3 drops of Bromothymol blue, indicator, were added
3. the residual butyl amine was titrated with 0.1 normal of hydrochloric acid.

The prepolymer was then stored in the freezer for later use. For example, for a prepolymer composed of 75% TERATHANE 2000 and 25% Polymer A, 58.2 gms of Polymer A were reacted with 55.1 gms MDI for 30 minutes and then 174.6 gms of TERATHANE 2000 were added and the reaction was continued until the final NCO value was reached (about 3 hours).

Comparative Method

In the comparative method the polar polyol was reacted with the MDI first. For the example given above the same amount of reactants were used except that the TERATHANE 2000 was reacted with MDI at 90° C. for 30 minutes followed by the addition of Polymer A. The reaction was continued until the final NCO value was reached.

TPU Preparation

To prepare a TPU with a hard segment content of 22% the prepolymers prepared above were heated to 100° C., mixed with the stoichimetric amount of butane diol, and then poured into a preheated mold for curing. For the TERATHANE 2000/Polymer A prepolymer example described above, 1.06 grams of butane diol were added to 29.06 grams of prepolymer to make a 22% hard segment TPU. Each of the components were preheated to 100° C. and then mixed for 30 seconds before being poured into a mold which had been preheated to 110° C. The mold was closed to contact pressure until the gel point was reached and then pressurized to 20,000 psi for one hour. After removal from the press, samples were post cured for 16 hours at 105° C.

For hard segment contents of 30, 40, and 50%, MDI and correspondingly more butane diol were added. For example, to prepare a 40% hard segment polymer from the above prepolymer, 3.33 grams of butane diol and 6.5 grams of MDI were added to 28.26 grams of prepolymer. The materials were mixed and molded as described above. After demolding, the samples were allowed to equilibrate at room temperature for seven days before microtensiles were punched directly from these sheets for tensile testing. The Shore A Hardness was measured by stacking sheets to make a ⅜ inch thick sample.

EP 0732 349 Patent Application Method

A mixed prepolymer was made by mixing 17.69 gms POLYMER B with 95.87 grams DESMOPHEN 2502, from Bayer, at 80° C. 40.0 grams of MDI were added and the reaction was stirred for about 2 hours. A catalyst, DABCO T-12 from Air Products, was mixed into the prepolymer to a final concentration of 20 ppm. To form the TPU, 9.9 parts butane diol chain extender was stirred into the prepolymer. The mixture was poured into a mold preheated to 120° C. and allowed to cure for 4 minutes and then for another 4 minutes at 110° C. before slow cooling to room temperature. A comparative example using this process appears in Table 5.

The method of this invention was used to prepare the same formulation by altering the order of addition. 40 grams of MDI were added to the reaction kettle and allowed to melt at 80° C. 17.69 grams of Polymer A were added and allowed to react for 30 minutes. 92.87 grams of DESMOPHEN 2502 were added and the reaction was continued for two hours at 80° C. The TPU was made by mixing 9.9 grams of butane diol into the prepolymer. The mixture was poured into a mold that had been preheated to 100° C. The mold was closed to contact pressure until the gel point was reached and then pressurized to 20,000 psi for one hour. After removal from the press, samples were post cured for 16 hours at 105° C. This prepolymer was also used to make a TPU with a hard segment content of 50% by adding 8.82 grams of butane diol and 4.98 grams of MDI to 29.43 grams of prepolymer and molding as described above.

Example 1

Prepolymers Made with Polyethers

Polytetramethylene Glycol Prepolymers

Polytetramethylene glycol, PTMEG or PTMO, is one of the most common polyols used in high performance TPU's. It is made by DuPont under the tradename TERATHANE® and BASF under the name PolyTHF®. PTMEG's excellent properties are derived from the fact that it is strictly difunctional and has a good balance of low Tg and crystallizability at room temperature. Low molecular weight samples, <1000, are liquids at room temperature while above 2,000 MW, they are highly crystalline at room temperature. Therefore, the 2,000 mw range is typical for use in TPU's because while it is able to crystallize on stretching, it is not highly crystalline at room temperature in a TPU. The tensile properties are highly dependent on the hard segment content. At low hard segment content the samples are almost clear and have very poor temperature resistance because of the compatibility of the hard and soft phases. At high hard segment the samples are milky due to phase separation before the completion of the chain extension reaction. Thus, it is not surprising that commercial TPU's have hard segments in the range from 35 to 55% hard segment.

The prepolymers were synthesized by two methods, described above. In the preferred method the EB Diol is reacted with the MDI before the addition of the PTMEG, and in the comparative method the PTMEG is added first. Compared to the control both methods improve the strength of the TPU at low hard segment content, but the EB Diol first method produces much greater improvements in tensile strength at low hard segment content with minimal loss in properties at high hard segment content. At 22% hard segment the addition of <20% EB Diol basis the total TPU composition resulted in a surprising three times increase in tensile strength with no loss in elongation and a slight increase in hardness. We can infer from these data that the presence of EB Diol helps to drive phase separation between the hard and soft phases, especially at low hard segment content. The elongation to break data and the Shore A hardness data in Table 2 are consistent with good incorporation of the EB Diol by the preferred method.

TABLE 2

| % HS | % EB Diol F | TS | EB (%) | 50% Mod | 100% Mod | 300% Mod | Shore A | Comments |
|---|---|---|---|---|---|---|---|---|
| 22 |  | 1328 | 1006 | 184 | 233 | 387 | 48 | Control |
| 30 |  | 2522 | 458 | 538 | 700 | 1471 | 74 | Control |
| 40 |  | 6073 | 554 | 1056 | 1322 | 2802 | 84 | Control |
| 50 |  | 3169 | 284 | 1488 | 1790 |  | 87 | Control |
| 22 | 19.5 | 3918 | 934 | 265 | 360 | 688 | 59 | EB Diol first |
| 30 | 17.5 | 5582 | 777 | 544 | 729 | 1539 | 74 | EB Diol first |
| 40 | 15.0 | 5311 | 555 | 1080 | 1346 | 2645 | 80 | EB Diol first |
| 50 | 12.5 | 3082 | 281 | 1357 | 1800 |  | 86 | EB Diol first |
| 22 | 19.5 | 2380 | 668 | 362 | 483 | 938 |  | T-2000 first |
| 30 | 17.5 | 3175 | 480 | 700 | 900 |  |  | T-2000 first |
| 40 | 15.0 | 3461 | 505 | 1096 | 1309 |  |  | T-2000 first |
| 50 | 12.5 | 1704 | 152 | 1452 | 1623 |  |  | T-2000 first |

% EB Diol = the weight fraction of the polyol that was replaced by the total weight
% HS = the sume of the chain extender and isocyanate weight
% EB Diol F = the % weight of EB Diol in the final TPU
TS = Tensile strength in psi
EB % = Elongation to break in %
50% MOD = the Modulus at 50% elongation expressed in psi Example 2

High EB Diol Content PTMEG Prepolymers

Because of the low polarity of EB Diol, normal chain extenders such as butane diol are very difficult to use in batch mixing processes. One of the objectives of this work was to determine whether butane diol chain extension at hard segments beyond 25% was possible by the incorporation of polar polyols into a primarily EB Diol based system. We have replaced EB Diol with either 50 or 25 wt % PTMEG using the mixed polyol approach. These data are shown in Table 3.

TABLE 3

| EB Diol | Polyol 2 | % EB Diol | % HS | % EB Diol F | TS | EB (%) | 50% Mod | 100% Mod | 300% Mod | Comment |
|---|---|---|---|---|---|---|---|---|---|---|
| Polymer A | Terathane 2000 | 50 | 22 | 39.0 | 2275 | 667 | 310 | 434 | 864 | EB Diol first |
| Polymer A | Terathane 2000 | 50 | 30 | 35.0 | 2803 | 618 | 516 | 701 | 1307 | EB Diol first |
| Polymer A | Terathane 2000 | 50 | 40 | 30.0 | 2715 | 477 | 779 | 1067 | 1743 | EB Diol first |
| Polymer A | Terathane 2000 | 50 | 50 | 25.0 | 2699.7 | 280 | 1328 | 1731 |  | EB Diol first |
| Polymer A | Terathane 2000 | 75 | 22 | 58.5 | 2327 | 685 | 336 | 494 | 922 | EB Diol first |
| Polymer A | Terathane 2000 | 75 | 30 | 52.5 | 2118.9 | 397 | 519 | 762 | 1583 | EB Diol first |
| Polymer A | Terathane 2000 | 75 | 40 | 45.0 | 2141 | 288 | 789 | 1196 |  | EB Diol first |
| Polymer A | Terathane 2000 | 75 | 50 | 37.5 | 1821 | 142 | 1197 | 1644 |  | EB Diol first |
| Polymer B |  | 100 | 15 | 85.0 | 1180 | 830 | 190 | 300 | 680 |  |
| Polymer B |  | 100 | 20 | 80.0 | 1180 | 490 | 240 | 420 | 890 |  |
| Polymer B |  | 100 | 25 | 75.0 | 980 | 360 | 260 | 460 |  |  |
| Polymer B |  | 100 | 30 | 70.0 | 170 | 150 | 90 | 150 |  |  |
| Polymer B |  | 100 | 45 | 55.0 | 660 | 210 | 510 | 650 |  |  |

While the tensile strengths for the materials containing 50 and 75% EB Diol are lower than the high PTMEG content materials, they are still much higher than a TPU based on 100% EB Diol listed in Table 3. The presence of the more polar PTMEG allows greater effective compatibility with butane diol.

Example 3

Polypropylene Glycol Based Prepolymers

A similar set of experiments was carried out with prepolymers based on polypropylene glycol. The results are shown in Table 4. For this material the compatibility between the hard and soft segments was so great that at low hard segment content only a viscous liquid was formed. On the other hand, the polymers containing 25 or 50% EB Diol showed substantial strength and elongation to break. As was the case with the PTMEG based TPU's, the addition of a small amount of EB Diol appears to drive phase separation between the otherwise highly polar hard and soft blocks. The modulus temperature curve shows a single Tg at −45° C. for the soft segment. The melting point of the crystalline hard segment results in flow above 175° C. These temperatures indicate that the soft and hard segments are well separated.

Example 4

Polyester Based Prepolymers

Two different polyester diols were used to make TPU's: a 3,000 molecular weight hexamethylene adipate, FORMREZ 66–37, and a 2,000 molecular weight ethylene/butylene adipate, DESMOPHEN 2502 (Table 5). FORMREZ 66–37 is a polyol made for high performance TPU's with better than average properties for a polyester polyol. Here again, the addition of EB Diol to the polyester gave benefits in tensile strength at low hard segment content. Polyesters are often chosen for applications because the crystallinity of the soft block results in high tensile strength and relatively stiff TPU's. The Tg of the EB Diol remains at −44° C. indicating that it may be phase separated in the soft phase from the polyester. The polyester melting is complete at 51° C. followed by a rubbery plateau extending to the melting of the hard segment near 175° C. Because the crystallinity of the polyester block dominates the modulus at room temperature, it is more difficult to see differences in properties by measuring tensile properties than with PTMEG or PPG systems.

TABLE 4

| EB Diol | Polyol 2 | % EB Diol | % HS | % EB Diol F | TS | EB (%) | 50% Mod | 100% Mod | 300% Mod | Comment |
|---|---|---|---|---|---|---|---|---|---|---|
| | Acclaim 2350 | 0 | 22 | 0.0 | 0 | | | | | Viscous Liquid |
| | Acclaim 2350 | 0 | 30 | 0.0 | 215 | 43 | | | | Control |
| | Acclaim 2350 | 0 | 40 | 0.0 | 436 | 20 | | | | Control |
| | Acclaim 2350 | 0 | 50 | 0.0 | 1008 | 18 | | | | Control |
| Polymer A | Acclaim 2350 | 50 | 22 | 39.0 | 641 | 258 | 277 | 384 | | EB Diol first |
| Polymer A | Acclaim 2350 | 50 | 30 | 35.0 | 951 | 302 | 398 | 529 | | EB Diol first |
| Polymer A | Acclaim 2350 | 50 | 40 | 30.0 | 3901 | 509 | 895 | 1155 | 2196 | EB Diol first |
| Polymer A | Acclaim 2350 | 50 | 50 | 25.0 | 2851 | 330 | 1522 | 1780 | 2679 | EB Diol first |
| Polymer A | Acclaim 2350 | 25 | 22 | 19.5 | 179 | 55 | 175 | | | EB Diol first |
| Polymer A | Acclaim 2350 | 25 | 30 | 17.5 | 2028 | 490 | 497 | 667 | 1275 | EB Diol first |
| Polymer A | Acclaim 2350 | 25 | 40 | 15.0 | 2924 | 449 | 863 | 1138 | 2059 | EB Diol first |
| Polymer A | Acclaim 2350 | 25 | 50 | 12.5 | 3441 | 373 | 1671 | 1931 | 2981 | EB Diol first |

TABLE 5

| EB Diol | Polyol 2 | % EB Diol | % HS | % EB Diol F | TS | EB (%) | 50% Mod | 100% Mod | 300% Mod | Comment |
|---|---|---|---|---|---|---|---|---|---|---|
| | Formrez 66-37 | 0 | 22 | 0 | 3908 | 744 | 702 | 740 | 1424 | |
| | Formrez 66-37 | 0 | 30 | 0 | 5346 | 741 | 1172 | 1300 | 2410 | |
| | Formrez 66-37 | 0 | 40 | 0 | 5749 | 510 | 1484 | 1807 | 3461 | |
| | Formrez 66-37 | 0 | 50 | 0 | 6141 | 408 | 2111 | 2500 | 4609 | |
| Polymer A | Formrez 66-37 | 0.25 | 22 | 0.195 | 5328 | 666 | 713 | 855 | 1791 | EB Diol first |
| Polymer A | Desmophen 2502 | 0.16 | 31 | 0.110 | 3574 | 444 | 1057 | 1275 | 2404 | EP 0732 349 method - comparative example |
| Polymer A | Desmophen 2502 | 0.16 | 31 | 0.110 | 5815 | 616 | 692 | 902 | 2111 | EB Diol first |
| Polymer A | Desmophen 2502 | 0.16 | 50 | 0.080 | 5793 | 379 | 2196 | 2507 | 4577 | EB Diol first |

Table 5 also contains the comparison with the EP 0732 349 patent application comparative example. Unlike the previous materials, these prepolymers were made with a target of 31% hard segment. This means that they are produced using a significantly higher NCO:OH ratio than the other prepolymers discussed herein. High NCO content prepolymers are common in the urethane industry because they have less chain extension and lower viscosities than lower NCO prepolymers. The lower chain extension might be expected to be a disadvantage for compatibility, but, as the examples of this invention in Table 5 show, the properties do not appear to be adversely effected. Both strength and elongation to break are clearly better for the prepolymer which is made by pre-reacting the EB diol with the MDI according to this invention as opposed to the patent application method of mixing the two polyols before MDI addition. In addition, the modulus of the material of this invention is lower than the patent application method. Thus the method of the present invention produces an elastomer that is both softer and stronger than the comparative product produced as described in EP 0732 349. It is likely that the comparative sample made by the patent application method was not as well reacted as samples made by the invention method because of the curing conditions employed. Table 5 also shows the properties of a 50% hard segment sample made with the EB diol/DESMOPHEN polyester system. These data show that high strength, high stiffness TPUs can be made in polyester systems using this technique.

Example 5

High EB Diol Content Polycarbonate Prepolymers

A series of polymers were made using mixtures of polycarbonate diols and EB diol (Polymer B) which has an equivalent weight of 1660. The polycarbonate diols were obtained from Stahl USA. The prepolymers were made by first reacting the EB diol and the complete amount of MDI required for the polymerization at 90° C. for 30 minutes. The NCO to OH molar ratio in the prepolymer was 3:1 for each of the three prepolymers. The polycarbonate diol was then added and the reaction was continued at 90° C. for an additional 90 minutes. The prepolymer was then chain extended with either 1,4-butane diol or 2-butyl-2-ethyl-1,3-propane diol (BEPD). The overall NCO/OH molar ratio was 1.02. The reacting TPU was then placed in a release coated aluminum tray and cured in vacuum at 95° C. for 16 hours.

The results are listed in Table 6. All three polyurethanes were elastomeric. They were opaque in the cured state. All three polyurethanes had moderate tensile strengths and elongations.

polycarbonate polyols, an isocyanate having an average functionality of two, and a chain extender which comprises:

(a) first reacting the polydiene and the isocyanate at 70 to 100° C. for 10 to 60 minutes, (b) adding to the reaction product of (a) the polymeric diol and reacting these components at 70 to 100° C. for 60 to 150 minutes to form a prepolymer, and (c) adding the chain extender and reacting these components at 70 to 125° C. for 1 to 24 hours to form a thermoplastic polyurethane.

2. The process of claim 1 wherein the polydiene is a polydiene diol, and a hard segment content of the thermoplastic polyurethane is from 15 to 50 percent by weight.

3. The process of claim 2 wherein the hard segment content is from 15 up to but less than 30 percent by weight.

4. The process of claim 1 wherein the polydiene is a hydrogenated polydiene diol with a molecular weight between 500 and 20,000 and a functionality of from 1.6 to 2.

5. The process of claim 4 wherein the polydiene diol is a hydrogenated polybutadiene diol having a molecular weight of from 1000 to 10,000 and a fuctionality of from 1.9 to 2.

6. The process of claim 1 wherein the isocyanate is a diisocyanate.

7. The process of claim 6 wherein the diisocyanate is an aromatic diisocyanate selected from the group consisting of 2,4-toluene diisocyanate, 4,4'-diphenylmethane diisocyanate, and paraphenyldiisocyanate.

8. The process of claim 1 wherein the chain extender is a hydrocarbon diol with a molecular weight of from 50 to 600.

9. The process of claim 8 where the chain extender is selected from the group consisting of ethylene glycol, 1,4 butane diol, 1,6 hexane diol, 2-ethyl-1,3-hexane diol, 2,2,4-trimethyl-1,3-pentane diol, and 2-ethyl-2-butyl-1,2-propane diol.

10. The process of claim 1 where the polymeric diol has a molecular weight of 500 to 10,000.

11. The process of claim 10 where the polymeric diol is selected from the group consisting of polytetremethylene glycols, polypropylene glycols, and poly (hexamethylene adipate) polyester polyols.

12. The product of the process of claim 1.

13. The product of the process of claim 3.

14. The process of claim 4, wherein the polydiene diol has from 1.6 to 2 terminal hydroxyl groups per molecule and hydroxyl equivalent weights between about 250 and about 10,000.

15. The process of claim 4, wherein the hydrogenated polybutadiene diol has a 1,4-addition content between about 30% and 70%.

TABLE 6

| EB Diol | Polyol 2 | % EB Diol | Chain Extender | % HS | % EB Diol F | TS | EB (%) | 50% Mod | 100% Mod | 300% Mod | Comment |
| --- | --- | --- | --- | --- | --- | --- | --- | --- | --- | --- | --- |
| Polymer B | PC-1733 | 90 | BEPD | 29.0 | 63.9 | 1600 | 350 | 390 | 660 | 1430 | EB Diol first |
| Polymer B | PC-1122 | 90 | BD | 22.8 | 69.4 | 1400 | 580 | 350 | 580 | 1030 | EB Diol first |
| Polymer B | PC-1122 | 90 | BEPD | 25.4 | 67.2 | 1470 | 500 | 350 | 560 | 1030 | EB Diol first |

We claim:

1. A process for preparing a thermoplastic polyurethane resin from a polydiene having terminal functional groups selected from the group consisting of hydroxy, amine, and carboxylic acid, at least one polymeric diol selected from the group consisting of polyester polyols, polyether polyols, and 16. The process of claim 4, wherein the hydrogenated polydiene diol is at least 90% saturated.

17. The process of claim 8, wherein the hydrocarbon diol has a hydroxyl equivalent weight between about 25 and about 200 grams per hydroxyl group.

18. The process of claim 1, wherein the thermoplastic polyurethane comprises:

15 to 40 percent by weight of the polydiene;

15 to 60 percent by weight of the polymeric diol;

10 to 25 percent by weight of the isocyanate; and 1 to 10 percent by weight of the chain extender.

19. The process of claim 18, wherein the thermoplastic polyurethane comprises a hard segment content of from 15 to 30 percent by weight.

20. The process of claim 18, wherein the thermoplastic polyurethane comprises a tensile strength of at least 1500 psi and a Shore A hardness of no more than 90.

* * * * *